Feb. 24, 1925.
F. R. JENNINGS
SIPHON DEVICE
Filed Dec. 18, 1923
1,527,190
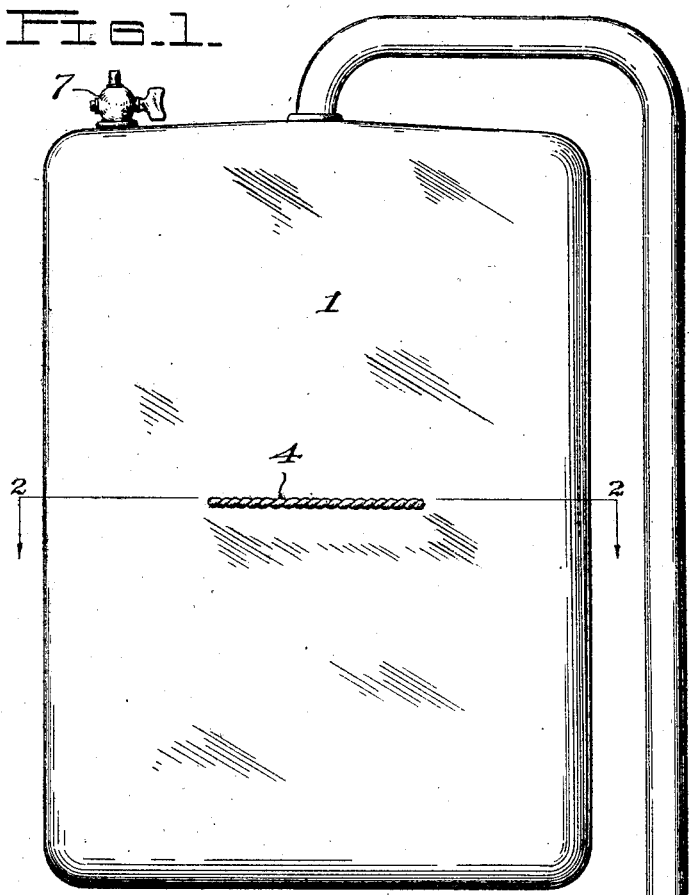
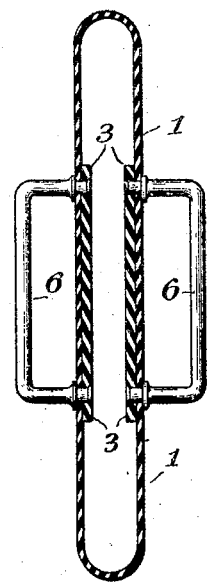
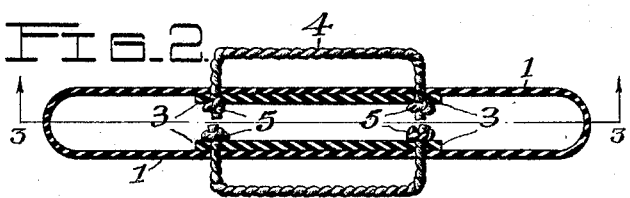
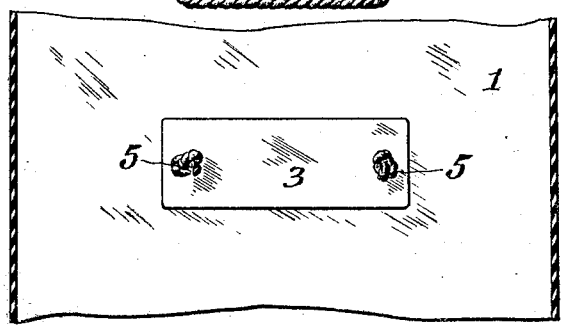
Inventor
Fred R. Jennings
Attorney Patented Feb. 24, 1925.

1,527,190

UNITED STATES PATENT OFFICE.

FRED R. JENNINGS, OF FAIRFIELD, CONNECTICUT.

SIPHON DEVICE.

Application filed December 18, 1923. Serial No. 681,322.

*To all whom it may concern:*

Be it known that I, FRED R. JENNINGS, a citizen of the United States, residing at the town of Fairfield, in the county of Fairfield and State of Connecticut, have invented certain new and useful Improvements in Siphon Devices; and I do declare the following to be a full, clear, and exact description of the invention, such as will enable others skilled in the art to which it appertains to make and use the same.

This invention relates to a siphon device, but more particularly has reference to a device of this nature which is especially adapted for the purpose of drawing liquid, such as gasoline, from receptacles that are not provided with convenient outlets.

In the accompanying drawing which forms a part of this application,

Figure 1 is an elevation showing my improved device;

Figure 2 is a section at the line 2—2 of Figure 1;

Figure 3 is a section at the line 3—3 of Figure 2, and

Figure 4 is a view similar to Figure 2, but showing particularly my improvement equipped with metal handles and reenforcing plates.

Similar numerals of reference denote like parts in the several figures of the drawing.

1 is a closed casing or bag made of rubber or any other flexible material that is impervious to air or liquid.

This casing is preferably elongated and comparatively narrow and is of any suitable shape. From the upper end of the casing extends a long tube or conduit 2 made of rubber or suitable material, which tube is secured to the casing and communicates with the interior thereof.

Cemented or otherwise secured to the inner wall of opposite sides of the casing are comparatively thick plates 3 that are preferably of rubber, and 4 are flexible handles, preferably of rope, that are secured to these plates at spaced locations in any suitable manner.

A very practical way of securing these handles is to extend their ends through the casing wall and plates 3 and then knot the ends as shown at 5 in Figure 2, the perforations made in said walls and plates to admit the rope being lined with cement, to render all parts additionally secure and air tight.

In utilizing my improvement, the casing is rolled into a bundle form so as to drive out as much air as possible, and the end of the tube 2 is inserted in the liquid contained in the receptacle; the casing is then unrolled and held in position in a plane below that of said receptacle with the hands of the user grasping the two handles; the side walls of the casing are then pulled apart, thus creating a vacuum in the casing, which causes the starting of the siphoning process which latter will then continue until the desired amount of liquid is obtained.

Instead of flexible handles, the casing may be equipped with metal handles 6, as shown at Figure 3, and the extreme ends of the latter may be countersunk within a metal plate 3, and metal handles will serve the purposes of this invention equally as well as flexible handles since they will not interfere with the rolling of the casing into a bundle.

In order to facilitate the ready flow of liquid, an air valve 7 may, if desired, be provided, although this is not necessary.

Since it is merely necessary that the side portions of the bag where the handles are attached should be reenforced, the bag may be made thicker at those portions, thus doing away with a special reenforcing member, but the special reenforcing parts are preferred since they are more economical.

I claim:—

1. A device of the character described, comprising a closed bag impervious to liquid and air and capable of being rolled into a convenient bundle for transportation, an elongated conduit leading from said bag and in communication with the interior thereof, comparatvely rigid plates secured to a limited area of opposite interior side walls of the casing, and handles fastened to said plates and extending exterior of the bag.

2. A device of the character described, comprising a flexible closed bag impervious to liquid and air, an elongated flexible tube secured to the top of said bag and communicating with the interior thereof, comparatively rigid reenforcing plates secured opposite each other and to a limited area of the interior walls of the sides of said bag, and handles exterior of said bag and directly opposite each other, said handles extending through the sides of the bag and secured at spaced locations to the reenforcing plates.

3. A device of the character described, comprising a closed elongated collapsible bag capable of being rolled into bundle form and having its opposite side walls reenforced throughout a limited area, means secured to the reinforced portions for forcing said side walls apart by a force manually applied whereby a vacuum is created, and a tube communicating with the interior of the bag and extending from the top thereof.

In testimony whereof I affix my signature hereto.

FRED R. JENNINGS.